3,489,514
ALUMINA FROM LOW GRADE ALUMINIFEROUS
ORES AND MINERALS
Harvey L. Slatin, New York, N.Y., assignor to Timax Associates, New York, N.Y., a partnership of New York
Filed Sept. 18, 1967, Ser. No. 668,611
Int. Cl. C01f 7/20
U.S. Cl. 23—142     11 Claims

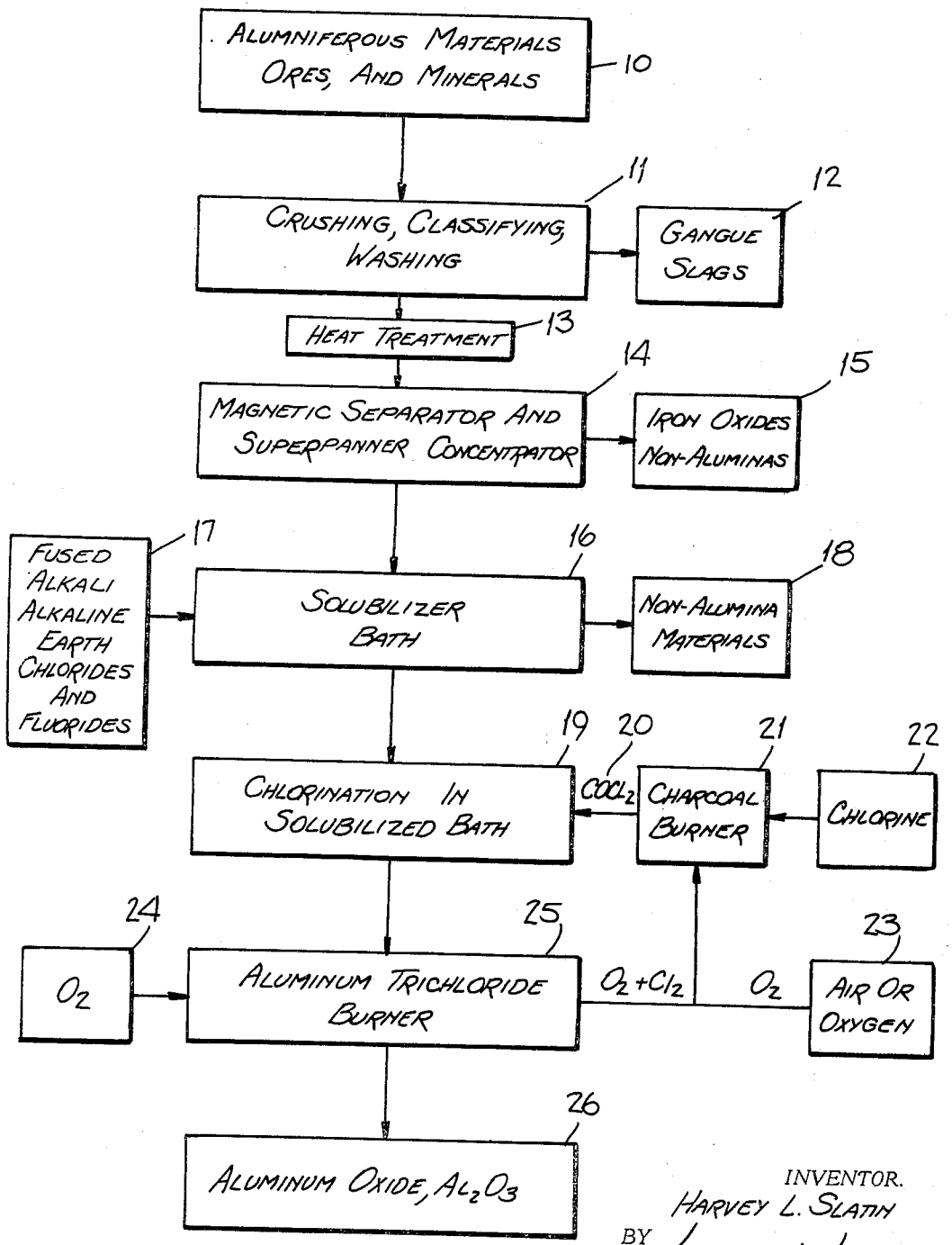

ABSTRACT OF THE DISCLOSURE

This invention relates to a process for the production of alumina, suitable for use in the production of aluminum and other uses, from low grade aluminum bearing ores and minerals.

The process involves the steps of:

(a) dissolving aluminiferous materials in a fused salt bath;
(b) solubilizing the alumina therefrom, causing the insoluble matter to sink in the bath;
(c) passing a chlorinating agent through the supernatant liquid containing the aforementioned alumina, to thereby produce gaseous anhydrous aluminum chloride; and
(d) burning the aluminum chloride in oxygen to produce pure alumina and to recover the chlorine.

FIELD OF THE INVENTION

The broad field of the invention is in the production of alumina. One of the more specific fields to which the invention can be applied is that of producing pure alumina for use in the production of aluminum.

DESCRIPTION OF THE PRIOR ART

Alumina, $Al_2O_3$, is used as feed material in the electrolytic extraction of aluminum metal in the conventional Hall process. The alumina usable in this process must be of high grade quality and have other special physical and chemical characteristics. Such alumina can be prepared only from high grade bauxite using, for example, the well-established Bayer process. In the Bayer process, high grade bauxite, containing 60% or more $Al_2O_3$, is digested in a caustic solution to form soluble aluminate from which, after separations and treatments, alumina is precipitated. The presence of silicas in bauxite is undesirable since silicas consume and are wasteful of caustic soda and in addition, create serious difficulties in the operation of the Bayer process.

Furthermore, although the demand for aluminum metal continues to soar, the unearthing and discovery of new sources of supply of usable grades of bauxite has not kept pace. The present supplies of bauxite are rapidly being depleted and new sources for alumina are sought. Heretofore, all attempts to make use of abundant low grade bauxites, alumina bearing clays, alumina minerals containing silicas, or like aluminaferous materials have failed to provide usable alumina. Not only Bayer type processes, but other processes using acids instead of alkali have also proven futile.

Seven percent of the earth's crust is comprised of aluminum and many sources for alumina exist which are not amenable to Bayer processing. Among these, for example, are andalusite, ($Al_2O_3 \cdot SiO_2$), a common mineral containing 63.2% alumina. Its high silica content precludes its use in conventional soda processing. Another common mineral, kyanite, contains 33⅓% aluminum; other potentially valuable materials are kaolinite, diaspore, gibbsite, nephelite, labradorite, alunite, and the like.

SUMMARY OF THE INVENTION

The primary object of this invention is to provide a simple, efficient, and economical process for producing high grade alumina from low grade aluminiferous materials.

Another object of this invention is to provide a process for producing pure alumina suitable for use in the electrolytic production of aluminum and other purposes from aluminum bearing clay, ore and minerals.

Still another object of this invention is to provide a process for the economical production of high grade alumina from source materials containing silicas.

Yet another object of this invention is to provide a process for the production of anhydrous aluminum chloride as an intermediate prduct in the production of pure alumina from low grade aluminum bearing materials.

A feature of the invention is the selective solubilization of the alumina bearing material from the high silica containing ore.

Another feature is the production of anhydrous aluminum chloride as an intermediate product by the use of chlorinating agents.

Another feature is the production of crystal alumina by the oxidation of aluminum trichloride.

DESCRIPTION

The above-mentioned features, objects and summary of this invention will become apparent by reference to the following description taken in conjunction with the accompanying drawing in which:

The drawing is a schematic flow chart of the process of this invention.

Pretreatment

In carrying out the invention, I have found that raw ore, containing high silica material and alumina can be advantageously pretreated. Such pretreatment and conditioning may consist of heat treatment in addition to the usual mechanical and electrical treatments and concentrations. Simple heat treatment of the ores and minerals, helps to "open up" these materials, i.e. break down complexes, making recalcitrant ores more amenable to solution and subsequent reaction in chlorination. I have also found that the fusion mixture aids in the disassociation or "opening up" process and greatly facilitates the chlorination reaction.

The pretreatment for a process according to this invention is illustrated in the drawing where the aluminiferous materials, ores and minerals 10, are first passed through a crushing, classifying, and washing step, 11, whereby gangue and slags, 12, are removed and separated. Next the remaining material is heat treated, 13, and passed into a magnetic separator and superpanner concentration 14 to remove the iron oxides and non-alumina material 15.

Solubilization

After pretreatment, the aluminiferous materials are solubilized in a fused salt bath 16, selected from the group of alkali chlorides, alkali fluorides, alkaline earth chlorides and fluorides, 17. For some unforeseen reason silicates, silica and other materials are not affected, and the solvent bath preferentially and selectively solubilizes aluminas leaving other materials undissolved or slightly dissolved. This is illustrated in the drawing where the solvent or solubilizer bath 16 has added to it fused alkali, or alkaline earth chlorides and fluorides 17. It is also possible to add mixtures of the above salts to the bath. After the addition of the salts 17, the non-alumina bearing materials 18 are separated in that further selection of the solvent salts, the density of the bath can be made such as to be less dense than the non-alumina bearing material 18. These extraneous materials will sink through the liquid salts containing the solubilized alumina and settle in the lower section of the solubilizing bath away from the solubilized alumina. It does not matter if the alumina is weakly or strongly bound in the feed material since the pretreatment or conditioning can be used to effect rapid solvation and fairly complete separation of the alumina.

The solvent salts which manifest the properties required for successful performance of this invention as mentioned above are the alkali chloride and fluorides and alkaline earth chlorides and fluorides. Any solvent so used must be inert to the action of phosgene or other chlorinating agent used in the chlorinating step of the process described below. Hence, many other halides, which might otherwise seem acceptable, must be avoided. Further, fluoride mixes, such as cryolite, which might appear useful, should be avoided as they tend to solubilize such undesirable compounds as titania, iron oxides, silica and others, leading to chlorine losses and contamination of the aluminum chloride and the subsequently formed alumina.

Sodium chloride and calcium chloride are good bases for such solvents as are the fluorides of sodium and calcium. It should be remembered that we may use mixes in the instant invention that would be unsatisfactory as a solvent electrolyte in conventional Hall process. Further, the use of eutectic mixes which form lower melting baths is advisable. As stated above, $AlF_3$ additions to the melt are beneficial and useful. Among other useful salts are $BaCl_2$, $MgCl_2$, $SrCl_2$, $CaCl_2$, NaCl, KCl, LiCl, KF, $CaF_2$, $MgF_2$, $BaF_2$, $SrF_2$, LiF, NaF, and $AlF_3$. Although small amounts of NaCl are beneficial and seem to catalyze the chlorination reaction, larger quantities cause undesirable side reaction products and losses due to the volatility of $Na_3AlCl_6$.

The solvent bath must be anhydrous and all feed materials must also be anhydrous. The preferred solvent bath is comprised of calcium chloride-calcium fluoride eutectic with some aluminum fluoride.

This type of solvent will selectively and preferentially solubilize small percentages of alumina, even alumina in combination. As the solubilized alumina is converted to volatile aluminum trichloride, more alumina is solubilized and brought into the sphere of reaction by convection, stirring of the bath, and concentration gradients. Silica, in particular, appears not to be affected or chlorinate under the conditions of the reaction.

Chlorination

After the alumina has been solubilized, it is necessary to remove it from the other impurities to obtain the final product, pure alumina. To do this, the solution or supernatant liquid of the bath, now containing the alumina, is reacted with phosgene or other chlorine containing gas to form aluminum trichloride. Under these conditions, only alumina reacts because it is the only compound within the solution subject to the action of the reactants, the solvent being inert to the action of the chlorinating agents. The overall reaction is:

$Al_2O_3$(solution)+$3COCl_2$(gas)=$2AlCl_3$(gas)
+$3CO_2$)gas); $\Delta F°$ 873° K—37,540 cal./mole $AlCl_3$ Aluminum chloride readily sublimes out of the melt and is easily separated and collected in a pure anhydrous condition. The solvent appears to aid the reaction and is neither consumed nor altered.

The chlorinating agents may be any of a number of chlorine reducing gases. For convenience and for other reasons, phosgene or carbon monoxide-chlorine mixtures are preferred. Also, in the chlorinating process, to facilitate operation of the process, other gaseous materials, inert to the reaction, may be mixed with the aforementioned chlorinating agents and passed through the solubilized alumina solution.

Depending on the eutectic salt mix used, the alumina chlorinates readily at 600° C. However, temperature of the bath may be varied from about 500° C. to over 1000° C. In order to limit bath distillation to a minimum, bath temperatures of 650°–750° C. are preferred. The reaction is exothermic and self-sustaining.

The aluminum chloride is condensed and separated from the $CO_2$ and excess $COCl_2$. The phosgene is easily recovered and re-cycled. The physical properties of $AlCl_3$ are such as to facilitate purification, if necessary, from unwanted metallic chlorides.

The chlorination must be carried out in an anhydrous atmosphere with anhydrous fused salts while maintaining the reaction products in an anhydrous condition. The solubility of chlorine, phosgene, and aluminum chloride in the fused solution at the operating temperature is nil.

In the drawing the chlorinating step, 19, is illustrated. Here phosgene gas $COCl_2$, 20, produced by combining oxygen 23, chlorine and carbon in a charcoal burner 21. The chlorine can be supplied by a chlorine source 22. This source is supplemented by recovering the oxygen and chlorine gases used in previous chlorinating steps by the oxidation step spelled out below.

Oxidation

While the anhydrous aluminum trichloride may be collected for use in the petro-chemical industry or for other purposes, the anhydrous aluminum trichloride may also be converted to pure alumina by burning the $AlCl_3$ in oxygen or dry air, and regenerating the chlorine for subsequent chlorination of additional aluminiferous materials. The reactions are:

$Al_2O_3$(solution)+$3COCl_2$(gas)=$2AlCl_3$(gas)+$3CO_2$(gas)
CO(gas)+$Cl_2$(gas)=$COCl_2$(gas)
$2AlCl_3$(gas)+$3/2O_2$(gas)=$Al_2O_3$(solution)+$3Cl_2$(gas)
$\Delta F°$ 1000° K.=—72,120 cal./mole $Al_2O_3$ Gaseous aluminum trichloride is mixed with dry oxygen, 24, with or without an inert gas carrier and ignited on passing through a nozzle in an aluminum trichloride burner 25. The reaction is highly exothermic and after ignition the reaction is self-sustaining. Preheating the $AlCl_3$, however, to about 500° C. is essential to prevent condensation and plugging of the lines and the use of an inert gas carrier prevents buildup of the precipitated $Al_2O_3$ on the nozzle.

The reaction temperature may be varied from about 600° C. to over 1200° C. In order to obtain the crystal structure and particle size best suited to electrolytic processing, a reaction temperature range of 750°–1050° C. is preferred.

The precipitate of aluminum oxide, 26, may be cooled by inert gas or impinging the material on a cold wall. All reactants must be anhydrous. Gas tight equipment is used to facilitate recovery of the chlorine for recycling or other purposes.

The precipitated, non-alumina material or alumina depleted material has a greater density than the bath and sinks to the bottom of the reaction vessel. From time to time, it is necessary to remove this excess bulk. This may be accomplished in several ways, as by "blowing down." Any valuable salts entrained in the solid refuse can be reclaimed and the residue used for other useful purposes, as for example, in the manufacture of valuable chemicals, pigments, and the like.

Since there may be some solvent losses, make-up salts, usually $CaF_2$, may be added to the bath as required. Similarly, in the recycling of the recovered chlorine, some make-up may be necessary.

This process has special economic features particularly if one generates his own phosgene or carbon monoxide-chlorine mixes since the gaseous by-product from the oxidation or "burning" reactor can be fed directly to a charcoal bed to regenerate the chlorinating agents. The process of the invention, thereby, becomes continuous and self-sustaining requiring feed materials and carbon for operation.

The following examples are illustrative of the invention and are not intended as limitations on the scope of the invention.

All tests were conducted in two steps: (1) chlorination and (2) oxidation, and for convenience, tank phosgene was used in the chlorination step. The chlorination was conducted in a quartz test tube 2¼″ OD x 14″ long. In order to conserve the quartz tube from breaking on salt solidification a graphite crucible was inserted within the quartz tube. This insert was 2″ OD x 1¾″ ID x 10″ long. The quartz tube was fitted with a male standard taper joint at its upper section. The female counterpart of this quartz standard taper joint was fitted through its center axis with a "Pyrex" water-cooled condenser. Through this condenser a close-fitting quartz tube could be passed and by means of a rubber sleeve, the contents of the chlorinator could be sealed from the atmosphere without fear of burning the rubber sleeve. The quartz tube, 12 mm. OD and fitted at the lower end with a disparger, could be moved up or down through the condenser, and positioned at any level desired within the reactor. A marked scale attached to the quartz tube gave its precise location. The upper end of the tube was adapted to feed phosgene or inert gas as desired for chlorination.

Near the upper section of the above described cap, a 1″ diameter arm was sealed. Through this arm passed the gaseous reaction products and unreacted gases. The arm led to a vertically disposed T; the arm forming the base leg. The vertical "top" of the T consisted of a shorter upper leg fitted with a one-holed rubber stopper through which a glass scraper could be moved to remove any aluminum trichloride or condensate which might collect inside this conduit. The lower leg of this T led into a sealed condensate collector-bottle maintained at room temperature. The outlet from this collector fed into a gas train consisting of, in series, a trap; a caustic gas absorber to absorb any excess chlorine, volatile chlorides, and carbon dioxide; a trap; a drying bottle to collect moisture; and a monitor to measure inert gas flow. Each section of the train was weighed individually before and after each run, and gave a measure of the completeness of the reaction. The condensate products were examined and analyzed using standard techniques. All gases, inert and reactive, were dried and metered through calibrated flow meters and corrected for temperature and pressure.

The tests were carried out as follows:

The fused salt mix was prepared by weighing out previously ground and dried halides. The aluminiferous sample was prepared by grinding to certain mesh sizes, run on a superpanner to concentrate the sample, run through a magnetic separator to remove magnetic materials, dried, and, in some instances, further conditioned by heat treating and the like. A weighed portion of this feed was mixed with the solvent halides, poured into the graphite crucible, and the above described apparatus was individually weighed and assembled. The fused melt stood 6 to 8 inches in depth. The assembled quartz reactor was placed in a vertical tube furnace which was thermostatically controlled. An inert gas, i.e. dried argon, was passed through the reactor, the condensate collector and the absorption train during the heating cycle necessary to bring the reactor contents up to the desired operating temperature. When the crucible contents reached the desired temperature, the inert gas flow was discontinued, the quartz gas disparger was lowered into the molten solution until it was about 3″ below the surface of the liquid. The reactant gas, phosgene or carbon monoxide and chlorine mixtures, was fed into the salt solution and continued until the chlorination was complete. The process in these examples was run in batches. The rate of flow of the chlorinating gases, the time, temperature in the chlorinator, and the heat input was recorded regularly during the course of the experiment.

At the conclusion of the run, the flow of the chlorinating gas was discontinued and the system was purged with inert gas. The disparger was withdrawn slowly from the melt into the space above the salt bath to permit drainage of adherent salts. The apparatus and its contents were allowed to cool to room temperature under inert gas flow.

The loss in weight of the chlorinator gives a rough measure of the chlorination efficiency. The gain in weight and analysis of the collector product provides the chlorination efficiency for $AlCl_3$ production. The analysis of the salt residue permits calculation of the alumina recovery. From the differences in the absorption train weights, the efficiency of utilization of chlorine may be calculated. In this manner, a good material balance can be made.

The oxidation of aluminum trichloride to aluminum oxide was carried out in a quartz test tube 3½″ in diameter x 16″ long. The reactor was employed in a vertical position. The quartz tube was fitted at its upper end with a male standard taper joint. The female counterpart to this taper joint had a centrally disposed pair of concentric tubes sealed into the top of the female joint. The concentric tubes were 6″ long in the reactor and extended 2″ below the joint. The quartz tubes terminated in a fused alumina nozzle. Through the center tube, a mixture of carbon monoxide and oxygen was fed and used to ignite the aluminum trichloride-oxygen mixtures and to keep the nozzle tips clean. Through the outer tube, a hot mixture of $AlCl_3$ and $O_2$ gases were passed. All $AlCl_3$–$O_2$ lines were lagged and maintained at 500°–600° C. The carbon monoxide gases and oxygen were tank gases.

The $AlCl_3$ gas was generated from a boiler. The $AlCl_3$, from various sources, was anhydrous and so maintained. Dry oxygen gas was mixed with the $AlCl_3$ gas in a separate mixing chamber, the oxygen being in excess of the stoichiometric requirement for complete combustion of the $AlCl_3$.

Near the upper section of the above described cap, a 1″ diameter arm was sealed. The arm served to convey the regenerated chlorine, excess gases, and combustion gases to an absorption train, consisting of, in series, a water-cooled trap to catch any unreacted $AlCl_3$ or entrained $Al_2O_3$; $Cl_2$ and $CO_2$ absorber trap; $O_2$ absorber; trap; drying tube; and a monitor to measure inert gas flow.

Data was collected on time, reactor temperature, nozzle flame temperature, and the weight of the $AlCl_3$ boiler before and after the run. The gases were metered through calibrated flow meters and corrected for temperature and pressure and the absorbers and reactor were individually weighed before and after the run.

The apparatus was run as follows:

The $CO$—$O_2$ torch was ignited and the gases flow rate adjusted to give a sharp flame. The reactor was assembled including the absorption train and a dry inert gas was passed through the apparatus via the outer of the concentric tubes. The reactor tube, the $AlCl_3$—$O_2$ lines and the mixing chamber were brought to 500° C., and heat applied to the $AlCl_3$ boiler. The inert gas and the oxygen in the mixer are adjusted so that the $AlCl_3$—$O_2$ flame is white hot, above 1000° C. and preferably between 1200–1600° C. The particular $Al_2O_3$ impinges on the bottom and sides of the reactor, and on proper control, little $Al_2O_3$ is carried over to the water-cooled trap. In any event, no $Al_2O_3$ was found beyond the trap.

The analysis and difference in weights of the trap and reactor and the loss in weight of the boiler gave a measure of the combustion efficiency, and a material balance can be drawn.

EXAMPLE I

Bauxite feed

An eutectic mix of anhydrous $CaCl_2$—$CaF_2$ containing 5 wt. percent $AlF_3$ was mixed with dried bauxite, containing 59.4% alumina, ground to −60 mesh, and fused. At 700–750° C., the disparger was submerged in the fluid solution and the chlorination commenced and the procedure herein above described was carried out.

The following results are summarized below:

TABLE I

| | |
|---|---|
| Chlorination temperature, °C. | 750 |
| Efficiency of $Al_2O_3$, utilization, percent | 81 |
| Chlorination efficiency, percent | 93.6 |
| Analysis of $AlCl_3$ (by difference), percent | 99.4 |

The alumina recovery was low simply because the test was not run to completion. No significant amounts of Si, Fe, or Ti were found in the $AlCl_3$.

EXAMPLE II

Nephelene

A 65% nephelene sample was concentrated on a superpanner and 98% of the aluminiferous portion of the ore was recovered. A sample containing 24.0% alumina and 46.6% silica was mixed after heat treatment at 900° C. with a $CaCl_2$—$CaF_2$ eutectic mix containing 8% $AlF_3$, and melted. The chlorination procedure described above was followed and the results obtained are summarized below.

TABLE II

| | |
|---|---|
| Chlorination temperature, °C. | 900 |
| $Al_2O_3$ recovery efficiency, percent | 63 |
| Chlorination efficiency, percent | 84.4 |
| $AlCl_3$ (by difference), percent | 99.6 |

The $AlCl_3$ was free of iron and silicon. The low chlorination efficiency is attributable to equipment design. This reaction, too, was not run to completion, accounting for the low alumina recovery.

EXAMPLE III

Labradorite

A 75% labradorite sample containing 23.2% $Al_2O_3$ and 38.0% silica was ground to −60 mesh and mixed with a $NaCl$—$CaCl_2$ eutectic salt containing 10% $CaF_2$. The chlorination procedure outlined above was followed and the results obtained are summarized below.

TABLE III

| | |
|---|---|
| Chlorination temperature, °C. | 660 |
| $Al_2O_3$ recovery efficiency, percent | 63 |
| Chlorination efficiency, percent | 78 |
| $AlCl_3$ content, percent | 99.0 |

The $AlCl_3$ contained traces of iron chloride but no silicon. This reaction was not run to completion and the limitation of the apparatus used accounts for the low chlorination efficiency.

EXAMPLE IV

Aluminum trichloride

The oxidation step of the invention was run on aluminum trichloride obtained from various sources, including samples obtained in Examples I, II, and III above. The apparatus and procedure described above was employed and the results obtained are summarized below.

TABLE IV

| | Run 1 | Run 2 | Run 3 |
|---|---|---|---|
| Reactor temperature, °C | 500 | 500 | 500 |
| $AlCl^3$ flame temperature, °C | 890 | 1,050 | 1,270 |
| Chlorine recovery efficiency, percent | 99.0 | 99.4 | 99.5 |
| $Al^2O^3$ conversion efficiency, percent | 98.5 | 99.9 | 99.9 |
| $Al^2O^3$ purity, percent | 99.9 | 99.9 | 99.9 |

What is claimed is:

1. A process for the production of alumina from aluminiferous material comprising:
   (a) pretreating said aluminiferous material to form an anhydrous aluminiferous material;
   (b) mixing said hydrous aluminiferous material in an inert anhydrous eutectic fused salt at a temperature between 500° C. to 1000° C. to selectively solubilize the anhydrous alumina of said aluminiferous material, said salt including at least one salt selected from the group consisting of alkali metal chloride, alkali metal fluoride, alkaline earth metal chloride and alkaline earth metal fluoride;
   (c) separating the insoluble material from the solubilized anhydrous alumina;
   (d) chlorinating said solubilized anhydrous alumina to form anhydrous aluminum trichloride; and
   (e) oxidizing said aluminum trichloride at a temperature between about 600° C. to 1200° C. to produce alumina.

2. A process for the production of alumina from aluminiferous material as described in claim 1 in which the pretreating step comprises the heating of the aluminiferous material to form an anhydrous material before mixing said material with the anhydrous fused salt bath.

3. A process for the production of alumina from aluminiferous material as described in claim 2 in which the pretreating step further comprises removing substantially all the iron oxides and non-alumina bearing materials.

4. A process for the production of alumina from aluminiferous material as described in claim 3 in which the pretreating step further comprises crushing, classifying and washing said material and passing said material through a magnetic separator superpanner concentrator.

5. A process for the production of alumina as described in claim 1 wherein the chlorinating step is carried out by using phosgene gas with said solubilized alumina.

6. A process for the production of alumina as described in claim 1 wherein the chlorinating step is carried out by reacting carbon monoxide and chloride gas mixture with said solubilized alumina.

7. A process for the production of alumina from aluminiferous material comprising:
   (a) mixing anhydrous aluminiferous material in an inert anhydrous eutectic fused salt bath at a temperature between 500° C. to 1000° C. to selectively solubilize the anhydrous alumina in said aluminiferous material, said salt including at least one salt selected from the group consisting of alkali metal chloride, alkali metal fluoride, alkaline earth metal chloride and alkaline earth metal fluoride;
   (b) separating the insoluble material from the solubilized anhydrous alumina;
   (c) chlorinating said solubilized anhydrous alumina to form gaseous anhydrous aluminum trichloride;
   (d) mixing said aluminum trichloride gas with an anhydrous gaseous oxidizing agent; and
   (e) igniting said mixture at a nozzle opening to form alumina and chlorine gas.

8. A process for the production of aluminum chloride from anhydrous alumina bearing materials comprising:
   (a) selectively solubilizing the anhydrous alumina in said alumina bearing material in an inert anhydrous eutectic fused salt bath at a temperature between 500° C. and 1000° C., said salt including at least one salt selected from the group consisting of alkali earth metal chloride, alkali metal fluoride, alkaline earth metal chloride, and alkaline earth metal fluoride;
   (b) separating the insoluble material from the solubilized anhydrous alumina;
   (c) chlorinating said solubilized anhydrous alumina solution with a gaseous chlorinating agent to form anhydrous aluminum trichloride; and
   (d) collecting said aluminum trichloride.

9. A process for the production of aluminum chloride from alumina bearing materials as described in claim 8 wherein said fused salt bath contains aluminum fluoride as the fused salt.

10. A process for the production of aluminum chloride from alumina bearing materials as described in claim 9 wherein said chlorinating agent is phosgene.

11. A process for the production of aluminum chloride from alumina bearing materials as described in claim 9 wherein said chlorinating agent is a carbon monoxide and chlorine mixture.

References Cited

UNITED STATES PATENTS

| | | | |
|---|---|---|---|
| 3,006,723 | 10/1961 | Loomis | 23—88 |
| 3,052,518 | 9/1962 | Frey | 23—93 |
| 3,043,657 | 7/1962 | Hughes et al. | 23—142 |
| 3,336,731 | 8/1967 | Phillips et al. | 23—93 XR |
| 3,406,009 | 10/1968 | Gould et al. | 23—93 |
| 618,772 | 1/1899 | Blackmore | 23—154 XR |
| 1,647,446 | 11/1927 | Wolcott | 23—92 |
| 1,875,105 | 8/1932 | Muggleton et al. | 23—92 |
| 2,084,290 | 6/1937 | McAfee | 23—95 |
| 2,235,644 | 3/1941 | Richardson | 23—1 XR |
| 2,238,421 | 4/1941 | Krucoff | 23—93 |
| 292,742 | 7/1943 | Beck et al. | 23—1 |
| 2,387,228 | 10/1945 | Arnold | 22—93 |
| 2,750,257 | 6/1956 | Johnson | 23—93 |
| 2,768,070 | 10/1956 | Brazaitis | 23—93 XR |
| 2,823,982 | 2/1958 | Saladin et al. | 23—202 |

EDWARD STERN, Primary Examiner

U.S. Cl. X.R.

23—193, 312

PO-1050
(5/69)

UNITED STATES PATENT OFFICE
CERTIFICATE OF CORRECTION

Patent No. 3,489,514        Dated January 13, 1970

Inventor(s) Harvey L. Slatin

It is certified that error appears in the above-identified patent and that said Letters Patent are hereby corrected as shown below:

Col. 7, line 74, add the word --bath-- after the words "fused salt" to read fused salt bath.

Col. 8, line 32, change the word "chloride" to --chlorine-- to read chlorine gas mixture.

Col. 8, line 58, delete the word "earth" to read consisting of alkali metal.

SIGNED AND
SEALED
JUN 16 1970

(SEAL)
Attest:

Edward M. Fletcher, Jr.
Attesting Officer

WILLIAM E. SCHUYLER, JR
Commissioner of Patents